United States Patent
Cromer et al.

[19]

[11] Patent Number: 6,003,081
[45] Date of Patent: Dec. 14, 1999

[54] DATA PROCESSING SYSTEM AND METHOD FOR GENERATING A DETAILED REPAIR REQUEST FOR A REMOTE CLIENT COMPUTER SYSTEM

[75] Inventors: Daryl Carvis Cromer, Cary; Gregory W. Kilmer, Raleigh; Gregory B. Pruett, Durham; Michael Steinmetz, Cary; James Peter Ward, Raleigh, all of N.C.

[73] Assignee: International Business Machines Corporation

[21] Appl. No.: 09/169,285
[22] Filed: Oct. 8, 1998
[51] Int. Cl.[6] .......................... G06F 13/38; G06F 15/17
[52] U.S. Cl. .................................... 709/224; 714/46
[58] Field of Search ................................ 709/223, 224; 714/46, 47, 48, 57; 370/241, 245; 395/200.53, 200.54, 183.22, 184.01, 185.01, 185.1

[56] References Cited

U.S. PATENT DOCUMENTS

| | | | |
|---|---|---|---|
| 3,786,430 | 1/1974 | Hajdu et al. | 340/172.5 |
| 4,062,061 | 12/1977 | Batchelor et al. | 364/900 |
| 4,133,477 | 1/1979 | Marino et al. | 235/304 |
| 4,176,941 | 12/1979 | Brietenlam et al. | 355/14 R |
| 4,434,489 | 2/1984 | Blyth | 371/29 |
| 4,497,057 | 1/1985 | Kato et al. | 371/29 |
| 4,503,535 | 3/1985 | Budde et al. | 371/11 |
| 4,514,845 | 4/1985 | Starr | 371/15 |
| 4,514,846 | 4/1985 | Federico et al. | 371/16 |
| 4,559,519 | 12/1985 | Matsumoto et al. | 340/286 |
| 5,119,379 | 6/1992 | Dara | 371/29.1 |
| 5,226,120 | 7/1993 | Brown et al. | 395/200 |
| 5,606,664 | 2/1997 | Brown et al. | 395/200.01 |
| 5,673,386 | 9/1997 | Batra | 395/183.14 |
| 5,774,645 | 6/1998 | Beaujard et al. | 395/183.01 |

*Primary Examiner*—Mark H. Rinehart
*Attorney, Agent, or Firm*—Lisa B. Yociss; Andrew J. Dillon

[57] ABSTRACT

A data processing system and method are described for permitting a server computer system to generate a detailed repair request utilized to a remote client computer system. The server and client computer systems are coupled together utilizing a local area network. In response to an error in operation of the client caused by a malfunctioning part included within the client, the client identifies the malfunctioning part. The client automatically transmits a notification of the error and an identification of the part to the server without requiring a user's presence at the client. The server generates a detailed repair request which includes the identification of the part. The repair request is detailed including an identity of the malfunctioning part to be repaired and is generated remotely by the server without a user's presence at the client being required.

29 Claims, 7 Drawing Sheets

| Type of Error | Detect Via | Shadowed in Alert-ASIC | Error Code | Part Numbers | Serial Number |
|---|---|---|---|---|---|
| Processor failure | HDW | YES/R1 | 100 | 67x0000 | 0000-01 |
| Bad Flash | HDW | YES/R2 | 101 | 67x1111 | 1111-01 |
| Defective power supply | HDW | YES/R3 | 150 | 67x2222 | 2222-01 |
| Defect memory SIMM | SW | NO | 200 | 67x3333 | 3333-01 |
| Excessive ECC errors | SW | NO | 201 | 67x4444 | 4444-01 |
| Floppy drive failure | SW | NO | 601 | 67x5555 | 5555-01 |
| HDD failure | SW | NO | 700 | 67x6666 | 6666-01 |
| Keyboard/Mouse failure | SW | NO | 1860 | 67x7777 | 7777-01 |
| Defect Fan | SW | NO | 170 | 67x8888 | 8888-01 |

Fig. 7

DATA PROCESSING SYSTEM AND METHOD FOR GENERATING A DETAILED REPAIR REQUEST FOR A REMOTE CLIENT COMPUTER SYSTEM

CROSS-REFERENCE TO RELATED APPLICATIONS

The present invention is related to the subject matter of co-pending patent application Ser. No. 09/024,231 entitled FULL TIME NETWORK AUXILIARY FOR A NETWORK CONNECTED PC assigned to the assignee herein named filed on Feb. 17, 1998 and incorporated herein by reference.

BACKGROUND OF THE INVENTION

1. Field of the Invention

The present invention relates in general to data processing systems and, in particular, to a data processing system capable for remotely generating a detailed repair request utilized to repair a client computer system. Still more particularly, the present invention relates to a method and system in a data processing system for permitting a server to remotely generate a detailed repair request identifying a malfunctioning part included within a client computer system where a user's presence is not required at the client in order to generate the repair request.

2. Description of the Related Art

Personal computer systems are well known in the art. They have attained widespread use for providing computer power to many segments of today's modern society. Personal computers may be defined as a desktop, floor standing, or portable microcomputer. Examples of such personal computer systems are IBM's PC series, Aptiva series, and Thinkpad series.

In addition, computer networks are employed to provide efficient computing capabilities throughout a large work area. Existing computer networks generally include a number of remotely located computer systems coupled via a data link to a server computer system or a central processing center.

With personal computers being increasingly connected into networks to allow transfers of data among the computers to occur, more operations such as maintenance and updating of applications and data collections are occurring over the network. It is desirable to schedule maintenance and updates to not interfere with productive work of the users of the computer systems. However, shifting the time for such activity may cause other problems. For example, there is no one available at the client computer system to answer questions and take action at the direction of the network manager during off hours.

In addition, errors may occur during the operation of a client computer system at any time. When these errors occur, a network manager or other operator must first determine that a client computer is not operating properly. Then, a repair technician must physically go to the client computer system and determine the type of error as well as identify which part or parts within the client computer system caused that error. As may typically occur, the technician may not have the necessary replacement parts. Therefore, additional time is lost while the technician obtains the parts and returns to repair the computer system.

In one known system, a client computer system which has experienced an operational error will report to its associated server computer system that such an error has occurred. However, the notification to the server computer system includes only the resulting error code. Utilizing the client computer system's network address, the server computer system can determine which client system generated the error. A repair technician must then determine the physical location of the client computer system and physically go to that client. Knowing the error code, the repair technician may guess the most likely type of parts which could have caused the particular error code. Once physically at the client, the repair technician must locate the part which caused the error. If the technician did not bring the correct replacement parts, another trip back to the client at a later time will be required before the client is repaired.

Therefore a need exists for a method and system in a data processing system for remotely generating a detailed repair request utilized to repair a client computer system without requiring a user's presence at the client.

SUMMARY OF THE INVENTION

It is therefore one object of the present invention to provide an improved data processing system.

It is another object of the present invention to provide a method and system in a data processing system for remotely generating a detailed repair request utilized to repair a client computer system.

It is yet another object of the present invention to provide a method and system in a data processing system for permitting a server to remotely generate a detailed repair request identifying a malfunctioning part included within a client computer system where a user's presence is not required at the client in order to generate the repair request.

The foregoing objects are achieved as is now described. A data processing system and method are described for permitting a server computer system to generate a detailed repair request utilized to a remote client computer system. The server and client computer systems are coupled together utilizing a local area network. In response to an error in operation of the client caused by a malfunctioning part included within the client, the client identifies the malfunctioning part. The client automatically transmits a notification of the error and an identification of the part to the server without requiring a user's presence at the client. The server generates a detailed repair request which includes the identification of the part. The repair request is detailed including an identity of the malfunctioning part to be repaired and is generated remotely by the server without a user's presence at the client being required.

The above as well as additional objectives, features, and advantages of the present invention will become apparent in the following detailed written description.

BRIEF DESCRIPTION OF THE DRAWINGS

The novel features are set forth in the appended claims. The present invention itself, however, as well as a preferred mode of use, further objectives, and advantages thereof, will best be understood by reference to the following detailed description of a preferred embodiment when read in conjunction with the accompanying drawings, wherein:

FIG. 7 is a pictorial example of a plurality of errors which may occur within a client computer system and their associated asset information in accordance with the present invention.

DETAILED DESCRIPTION OF A PREFERRED EMBODIMENT

A preferred embodiment of the present invention and its advantages are better understood by referring to FIGS. 1–7 of the drawings, like numerals being used for like and corresponding parts of the accompanying drawings.

The present invention is a data processing system and method for permitting a server computer system to generate a detailed repair request for a remote client computer system. When an error occurs in a remotely located client computer system, the client computer system determines the type of error, and then determines the part or parts which have caused the error. In order to generate a detailed repair request for the client, a server computer system must have information identifying the type of part and identifying the particular part.

The client identifies the particular part utilizing asset information stored in an erasable memory storage device or an application specific integrated circuit. Once each part has been identified, the client transmits a notification to the server that an error has occurred during operation of the client. The client also transmits an identification of the malfunctioning part without a user's presence being required at the client computer system.

The identification of the part includes asset information. The asset information is any type of information which identifies a particular part within a client computer system. The asset information may include a part number, a particular part's serial number, and/or a physical location for the client computer system which generated the error.

The asset information is stored in either an erasable memory element, an application specific integrated circuit, or in both. Both the erasable memory element and application specific integrated circuit are included with the client.

In a preferred embodiment, all asset information is stored in the erasable memory element (EEPROM). Duplicate copies of some of the asset information is also stored in the application specific integrated circuit (ASIC). For each type of error, a determination is made as to whether that type of error requires detection utilizing hardware. If the type of error requires detection utilizing hardware, the asset information for a malfunctioning part which causes that type of error is stored in the EEPROM as well as copied to the ASIC such that two copies of the asset information is maintained. For all other types of error, software will be able to detect the error. In these cases, the asset information is stored only in the EEPROM.

The ASIC is constantly powered as described in the related applications so even in the event of a processor or power failure the information stored in the ASIC will be accurate and will always be accessible over the local area network (LAN).

Figure 1:
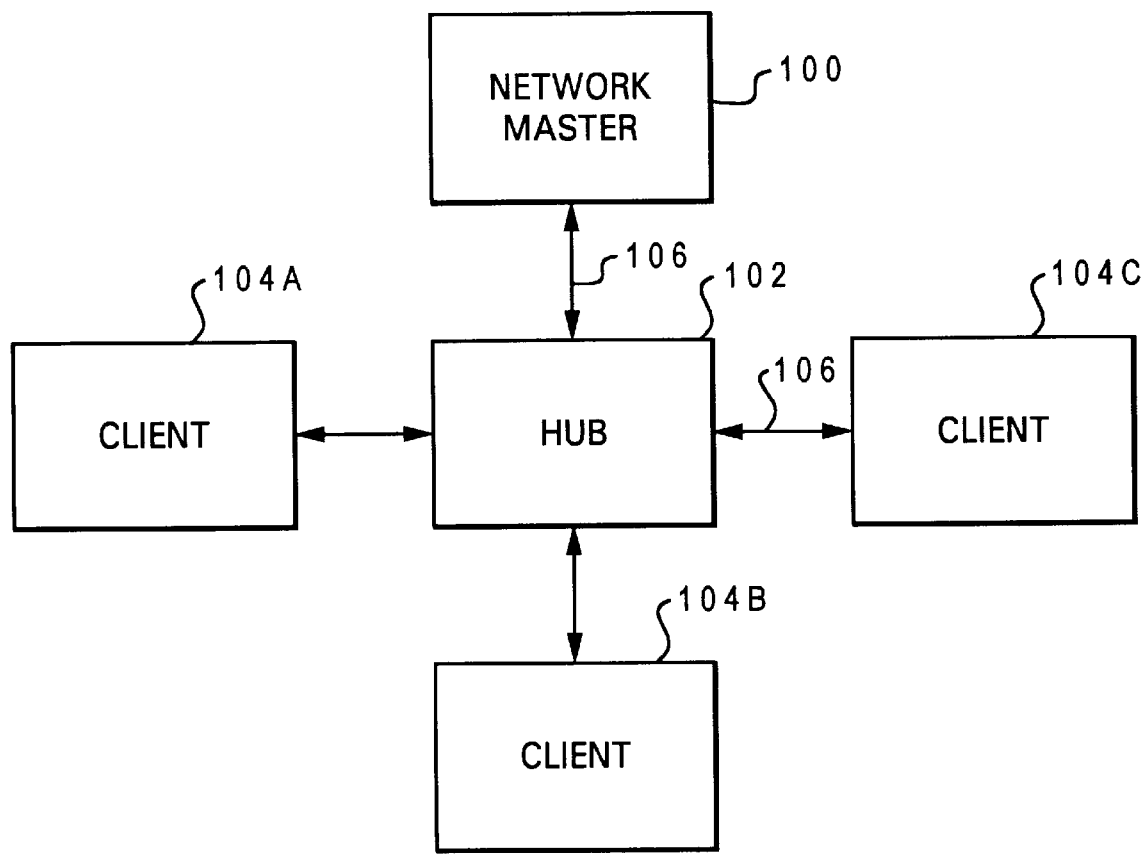
FIG. 1 illustrates a pictorial representation of a data processing system including a plurality of client computer systems coupled to a server computer system, or network master utilizing a hub in accordance with the method and system of the present invention.

FIG. 1 illustrates a pictorial representation of a data processing system including a plurality of client computer systems 104A, 104B, and 104C coupled to a server computer system, or network master 100, utilizing a hub 102 in accordance with the method and system of the present invention. Network manager system 100 is connected to a hub 102 utilizing a local area network (LAN) connector bus 106. Respective client systems 104A–C also connect to hub 102 through respective LAN busses 106. The preferred form of the network conforms to the Ethernet specification and uses such hubs. It will be appreciated, however, that other forms of networks, such as token ring, may be utilized to implement the invention.

Figure 2:
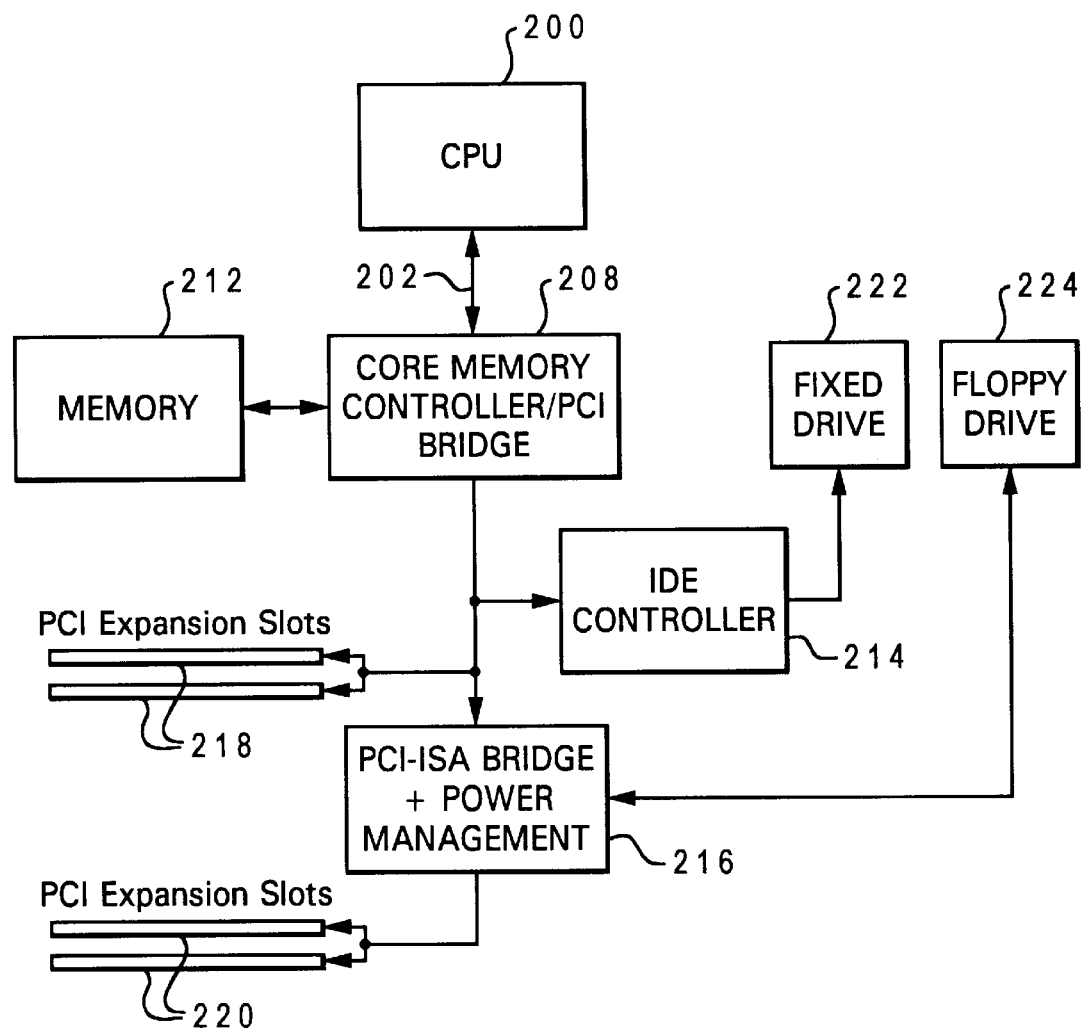
FIG. 2 depicts a pictorial representation of a computer system suitable for use as a client computer system in accordance with the method and system of the present invention.

FIG. 2 illustrates a pictorial representation of a computer system suitable for use as a client computer system in accordance with the method and system of the present invention. A central processing unit (CPU) 200 is connected by address, control, and data busses 202 to a memory controller and peripheral component interconnect (PCI) bus bridge 208. System memory 212, an integrated drive electronics (IDE) device controller 214, and a PCI bus to Industry Standard Architecture (ISA) bus bridge 216 are connected to PCI bus bridge 208. IDE controller 214 provides for the attachment of IDE compatible storage devices such as fixed disk drive 222. PCI/ISA bridge 216 provides an interface between the PCI bus and an optional feature or expansion bus such as the ISA bus. PCI/ISA bridge 216 includes power management logic. Typically, client system 104 will also include a fixed drive 222 and a floppy drive 224 for data and program storage. A PCI standard expansion bus with connector slots 218 is coupled to PCI bridge 208. PCI connector slots 218 may receive PCI bus compatible peripheral cards. An ISA standard expansion bus with connector slots 220 is connected to PCI/ISA bridge 216. ISA connector slots 220 may receive ISA compatible adapter cards (not shown). It will be appreciated that other expansion bus types may be used to permit expansion of the system with added devices. It should also be appreciated that two expansion busses are not required to implement the present invention.

Figure 3:
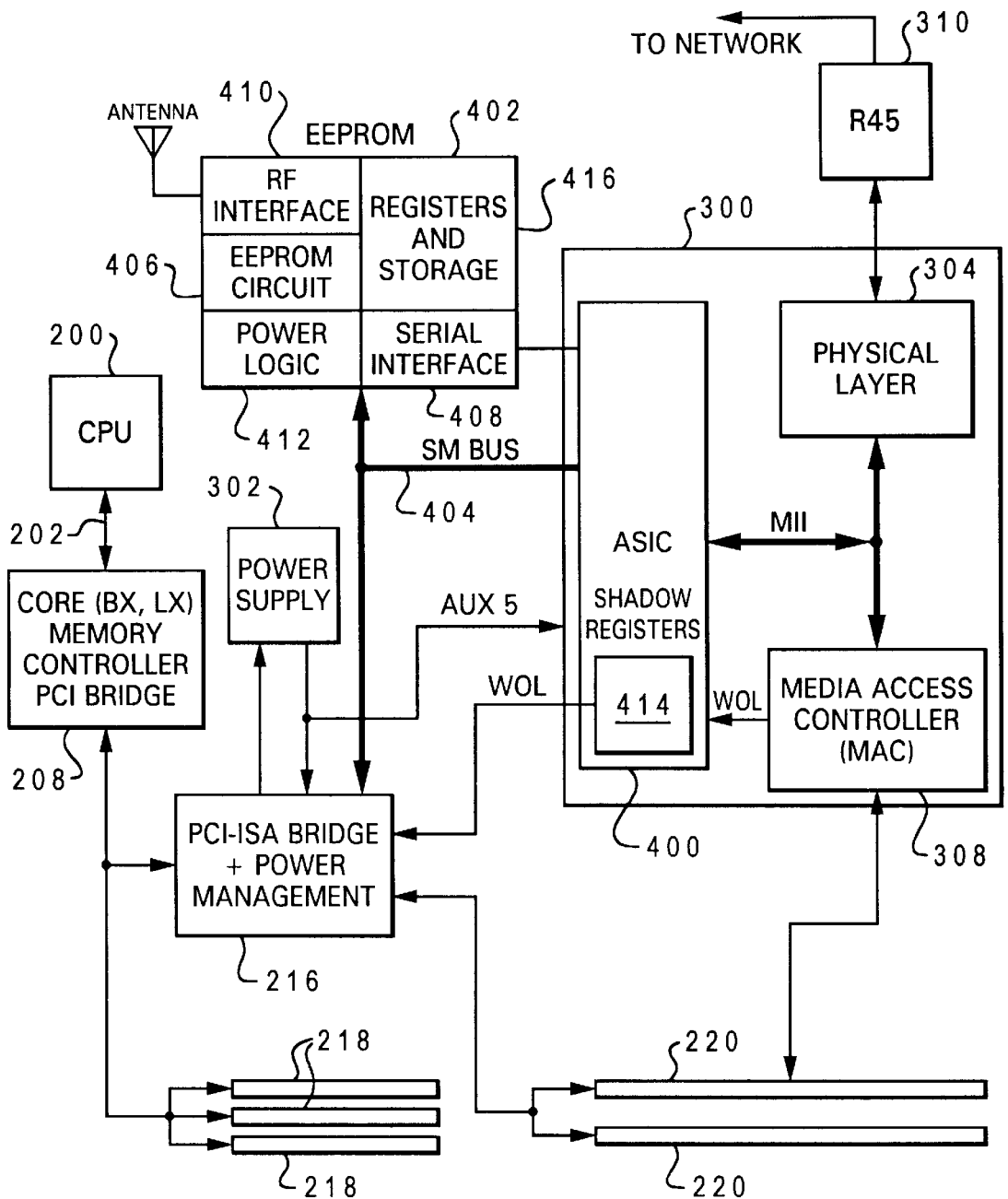
FIG. 3 illustrates a pictorial representation of a client computer system including a network adapter in accordance with the method and system of the present invention.

FIG. 3 depicts a pictorial representation of a client computer system 104 including a network adapter 300 in accordance with the method and system of the present invention. As illustrated in FIG. 3, network adapter 300 may be plugged into one of connector slots 220. However, those skilled in the art will recognize that network adapter 300 may be coupled to either the PCI bus or the ISA bus for allowing client computer system 104 to communicate with a LAN via connector 310 to hub 102.

Client computer system 104 includes a special power supply 302 which responds to a signal WOL which, through power management circuit 216, caused power supply 302 to switch on and supply full normal system power. Power supply 302 also outputs an auxiliary power signal AUX 5 which supplies full time power to power management chip 216 and to network adapter 300. In this manner, power supply 302 responds to a wakeup signal and powers up client computer system 104.

Network adapter 300 includes a physical layer 304 which conditions analog signals to go out to the network, for example an ethernet network over an R45 connector 306. A media access controller (MAC) 308 is included within network adapter 300. Media access controller 308 is coupled to bus 220 and processes digital network signals. MAC 308 serves as an interface between a shared data path media independent interface (MII) and the PCI bus (or ISA bus if adapter 300 were connected to the ISA bus). MAC 308 performs a number of functions involved in the transmission and reception of data packets. For example, during the transmission of data, MAC 308 assembles the data to be transmitted into a packet with address and error detection fields. Conversely, during the reception of a packet, MAC 308 disassembles the packet and performs address checking and error detection. In addition, MAC 308 typically preforms encoding/decoding of digital signals transmitted over the shared path and performs preamble generation/removal as well as bit transmission/reception.

Network adapter 300 further includes a media independent interface (MII) which is a local bus between MAC 308 and a physical layer 304. Physical layer 304 implements a fully compliant IEEE 802.3u MII interface for connection to MACs. The MII is a specification of signals and protocols which formalizes the interfacing of a 10/100 Mbps Ethernet Media Access Controller to the underlying physical layer 304.

Physical layer 304 can be a fully integrated device supporting 10 and 100 Mbps CSMA/CD Ethernet applications. Physical layer 304 receives parallel data from the MII local bus and converts it to serial data for transmission. Physical layer 304 is also responsible for wave shaping and provides analog voltages for transmission.

Network adapter 300 also includes a logic module 400 coupled to the MII bus between physical layer 304 and MAC 308. Preferably, logic module 400 is a hard-wired, application specific integrated circuit (ASIC) or a programmed general purpose processor programmed as described below. By connecting ASIC 400 to the MII bus, it can send and receive network packets using physical layer 304. Data from client computer system 104 is accessed by ASIC 400 over a system management bus (SM) 404. SM bus 404 is an additional I/O bus. With the trickle power supplied on bus AUX 5 from power supply 302, ASIC 400 is preferably powered full time.

An erasable memory element EEPROM 402 is included and is coupled to ASIC 400 and bridge 216 utilizing SM bus 404. EEPROM 402 includes an EEPROM circuit 406, a digital serial interface 408 for inputting and outputting signals, a radio frequency (RF) interface 410 for receiving wireless signals, and a power management logic circuit 412.

EEPROM 402 also includes a plurality of registers and storage locations 416. Storage locations 416 are utilized to store various information including asset information for a plurality of parts. For parts which generate errors which require detection utilizing hardware, the asset information for these parts is stored in shadow registers 414 which are included within ASIC 400 as well as within storage locations 416.

Figure 4:
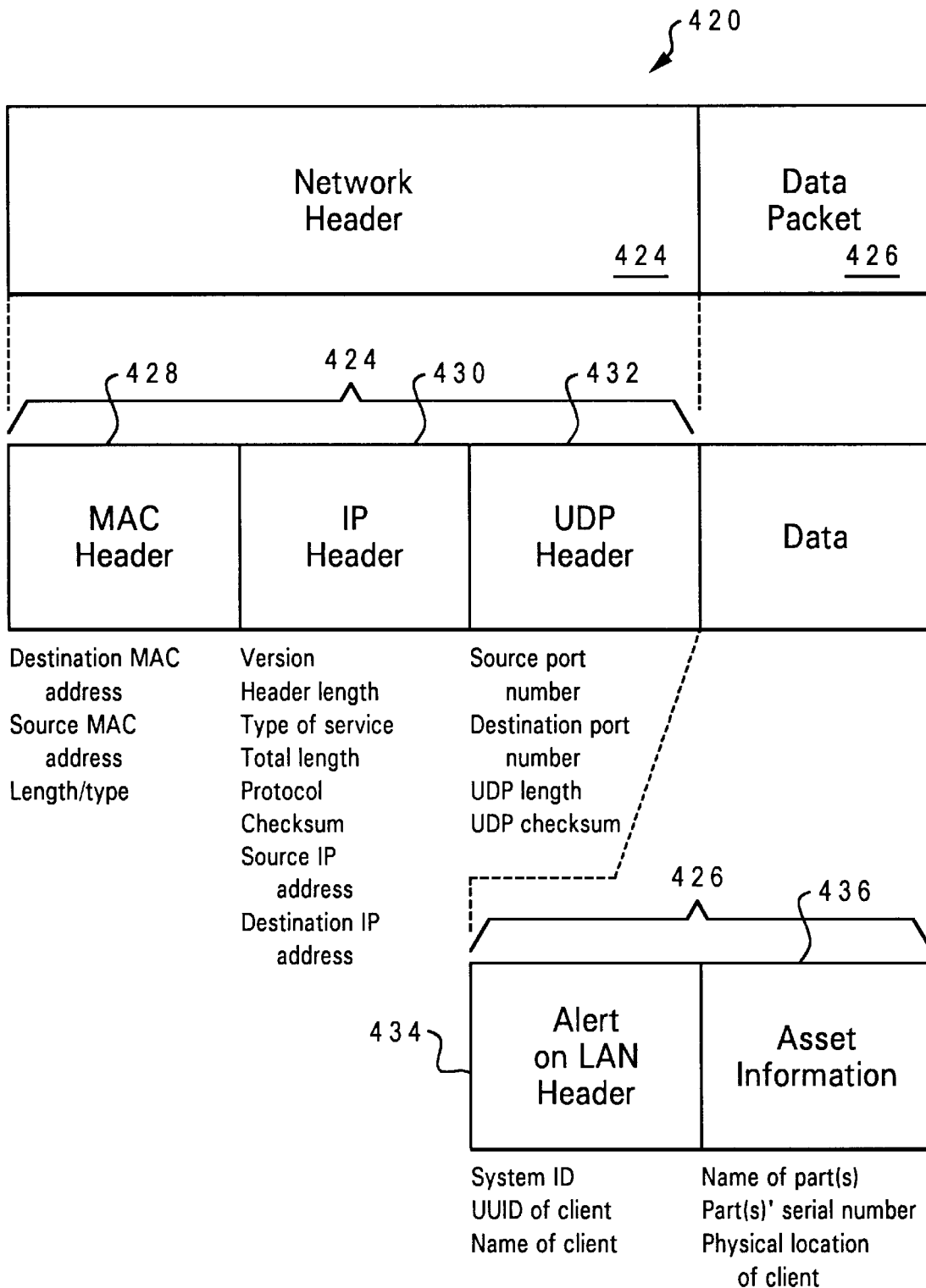
FIG. 4 illustrates a pictorial representation of a network packet which may be sent by a client computer system over the network in accordance with the method and system of the present invention.

FIG. 4 depicts a pictorial representation of a network packet which may be sent by client computer system 104 over the network in accordance with the method and system of the present invention. Each network packet 420 includes a network header 424 and a data packet 426.

Network header 424 includes a MAC header 428, IP header 430, and UDP header 432 which are all known in the art to provide addresses, identifiers, and other information for assuring correct transfer of the packet. Data packet 426 includes an alert-on-LAN header 434 and an asset information packet 436 in accordance with the present invention.

Alert-on-LAN header 434 includes a system ID, the UUID of this client computer system, and the name of the client. Asset information packet 436 includes the name of the part causing an error, the part's serial number or other identifying information, and the physical location of this client computer system which has generated an error.

Figure 5:
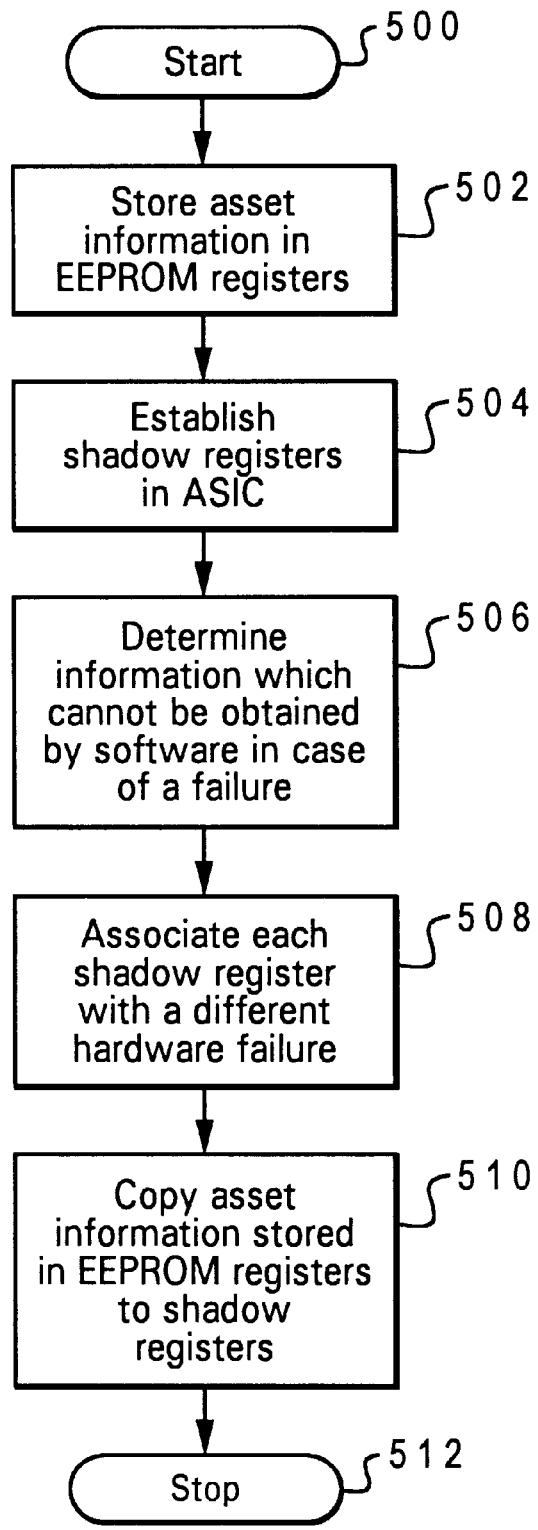
FIG. 5 depicts a high level flow chart depicting the creation of shadow registers within an ASIC and the storage of asset information in the shadow registers and within EEPROM storage locations in accordance with the method and system of the present invention.

FIG. 5 illustrates a high level flow chart depicting the creation of shadow registers within ASIC 400 and the storage of asset information in the shadow registers 414 and within EEPROM storage locations in accordance with the method and system of the present invention. The process starts as depicted by block 500 and thereafter passes to block 502 which illustrates the storage of asset information in storage locations, or registers, within EEPROM 402. The asset information may include any type of identifying information such as part names, part numbers, part serial numbers, client computer system serial number, and/or physical location of the client computer system or an associated part where the locations may be different.

Next, block 504 illustrates establishing a plurality of shadow registers in ASIC 400. The shadow registers are included to store asset information which is also stored in EEPROM 402. In this manner, some of the asset information is stored in two separate locations. The process then passes to block 506 which depicts the determination of information which cannot be obtained by software in case of a failure. For example, when the CPU, planar, or power supply fails, accurate asset information cannot be obtained from the storage locations within EEPROM 402. Therefore, this asset information is duplicated and stored within shadow registers.

Thereafter, block 508 illustrates the association of each shadow register with a different hardware failure. The ASIC 400 has special logic to trap error conditions which prevent POST from executing. Each shadow register is associated with a different one of the hardware failures which result in those error conditions which prevent POST from executing. The process then passes to block 510 which depicts the copying of the asset information stored in the EEPROM registers to the shadow registers. The process then terminates as illustrated by block 512.

Figure 6:
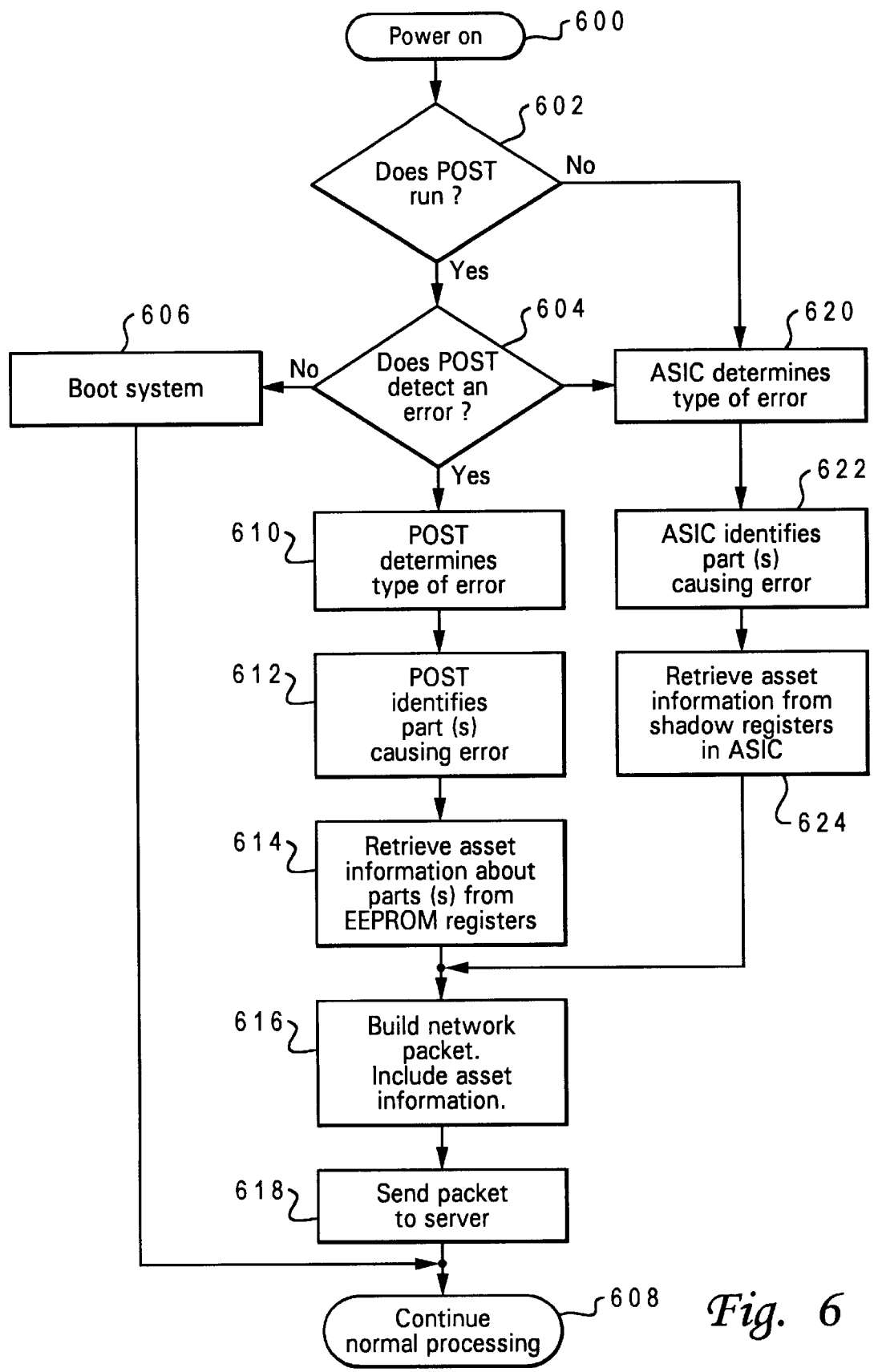
FIG. 6 illustrates a high level flow chart which illustrates the processing of an error and the sending of asset information from a client computer system which generated the error to a server computer system in accordance with the method and system of the present invention.

FIG. 6 depicts a high level flow chart which illustrates the processing of an error and the sending of asset information from a client computer system which generated the error to a server computer system in accordance with the method and system of the present invention. The process starts as depicted by block 600 and thereafter passes to block 602 which illustrates a determination of whether or not the power-on-self-test (POST) can run. When POST can run even though an error has occurred, the asset information may be obtained by software from the registers included within EEPROM 402. If POST can run, the process passes to block 604 which depicts a determination of whether or not POST detected an error during its execution. If a determination is made that POST did detect an error, the process passes to block 606 which depicts booting the client computer system. The process then passes to block 608 which illustrates the client computer system continuing normal processing.

Referring again to block 604, if a determination is made that POST did detect an error during its execution, the process passes to block 610 which depicts POST determining the type of error which occurred. Next, block 612 illustrates POST identifying the part or parts which caused the error. Thereafter, block 614 depicts the retrieval of the asset information from the EEPROM registers about the part(s) which caused the error. The process then passes to block 616 which illustrates the building of a network packet which includes the retrieved asset information. Block 618, then, depicts the client computer system sending the packet including the asset information to the server. The client computer, thereafter, continues normal processing as illustrates by block 608.

Referring again to block 602, if a determination is made that POST cannot run, the process passes to block 620. When POST cannot run, the error is a type of hardware failure such that software is not able to retrieve accurate asset information from EEPROM 402. For hardware failures, the asset information must be obtained from the shadow registers included within ASIC 400. Block 620 illustrates ASIC 400 determining the type of error. Next, block 622 depicts ASIC 400 identifying the part or parts which caused the error. Thereafter, block 624 illustrates the retrieval of the asset information from the shadow registers in ASIC 400. The process then passes to block 616 so that the asset information may be included in a network packet which is sent to the server computer system.

FIG. 7 is a pictorial example of a plurality of errors which may occur within a client computer system and their associated asset information in accordance with the present invention. For each type of error, an associated part number and serial number are stored. For example, a processor failure generates an error code of "100". Because this type of error is detected utilizing hardware, the asset information, part number and serial number in this case, are stored in EEPROM 402 in storage locations 416 as well as in shadow registers 414 in ASIC 400. When a defective fan condition occurs, the asset information is stored only within EEPROM 402 because this type of error is detectable utilizing software.

While a preferred embodiment has been particularly shown and described, it will be understood by those skilled in the art that various changes in form and detail may be made therein without departing from the spirit and scope of the present invention.

We claim:

1. A method in a data processing system for permitting a server computer system to generate a detailed repair request utilized to repair a remote client computer system, said server and said client coupled together utilizing a local area network, said method comprising the steps of:

in response to an error in operation of said client caused by a malfunctioning part included within said client, said client identifying said malfunctioning part by determining an identifier which identifies said part;

said client automatically transmitting a notification of said error and said identifier of said part to said server without requiring a user's presence at said client; and said server generating a detailed repair request including said identification of said part, wherein said repair request is generated remotely from said client without requiring a user's presence at said client.

2. The method according to claim 1, wherein said step of said client identifying said malfunctioning part further includes the step of said client identifying a serial number of said part.

3. The method according to claim 1, wherein said step of said client identifying said malfunctioning part further includes the step of said client identifying a physical location of said client.

4. The method according to claim 1, wherein said step of said client identifying said malfunctioning part further includes the step of said client identifying a part number of said part.

5. The method according to claim 2, further comprising the step of establishing a plurality of storage locations within an erasable memory element included within said client for storing identification information for each of a plurality of parts included within said client.

6. The method according to claim 5, further comprising the step of establishing a plurality of storage locations within a constantly powered application specific integrated circuit included within said client for storing a duplicate copy of identification information stored in some of said plurality of storage locations within said erasable memory element.

7. The method according to claim 6, further comprising the steps of:

determining if each of said plurality of parts requires failure detection utilizing hardware; and for each of said plurality of parts requiring failure detection utilizing hardware, copying identification information stored in one of said plurality of storage locations within said erasable memory element associated with each of said plurality of parts requiring failure detection utilizing hardware to one of said plurality of storage locations within said application specific integrated circuit.

8. The method according to claim 7, further comprising the steps of:

in response to an identification of said malfunctioning part, determining if said part is one of said plurality of parts requiring failure detection utilizing hardware;

if said part is one of said plurality of parts requiring failure detection utilizing hardware, said client identifying said part utilizing said plurality of storage locations within said application specific integrated circuit; and if said part is not one of said plurality of parts requiring failure detection utilizing hardware, said client identifying said part utilizing said plurality of storage locations within said erasable memory element.

9. A data processing system for permitting a server computer system to generate a detailed repair request utilized to repair a remote client computer system, said server and said client coupled together utilizing a local area network, comprising:

means responsive to an error in operation of said client caused by a malfunctioning part included within said client, for said client identifying said malfunctioning part by determining an identifier which identifies said part;

means for said client automatically transmitting a notification of said error and said identifier of said part to said server without requiring a user's presence at said client; and means for said server generating a detailed repair request including said identification of said part, wherein said repair request is generated remotely from said client without requiring a user's presence at said client.

10. The system according to claim 9, where in said means for said client identifying said malfunctioning part further includes means for said client identifying a serial number of said part.

11. The system according to claim 9, wherein said means for said client identifying said malfunctioning part further includes means for said client identifying a physical location of said client.

12. The system according to claim 9, wherein said means for said client identifying said malfunctioning part further includes means for said client identifying a part number of said part.

13. The system according to claim 10, further comprising means for establishing a plurality of storage locations within an erasable memory element included within said client for storing identification information for each of a plurality of parts included within said client.

14. The system to claim 13, further comprising means for establishing a plurality of storage locations within a constantly powered application specific integrated circuit included within said client for storing a duplicate copy of identification information stored in some of said plurality of storage location s within said erasable memory element.

15. The system to claim 14, further comprising:
  means for determining if each of said plurality of parts requires failure detection utilizing hardware; and
  means for each of said plurality of parts requiring failure detection utilizing hardware, for copying identification information stored in one of said plurality of storage locations within said erasable memory element associated with each of said plurality of parts requiring failure detection utilizing hardware to one of said plurality of storage locations within said application specific integrated circuit.

16. The system according to claim 15, further comprising:
  means responsive to an identification of said malfunctioning part, for determining if said part is one of said plurality of parts requiring failure detection utilizing hardware;
  means for if said part is one of said plurality of parts requiring failure detection utilizing hardware, said client identifying said part utilizing said plurality of storage locations within said application specific integrated circuit; and
  means for if said part is not one of said plurality of parts requiring failure detection utilizing hardware, said client identifying said part utilizing said plurality of storage locations within said erasable memory element.

17. A method in a data processing system for permitting a server computer system to generate a detailed repair request utilized to repair a remote client computer system, said server and said client coupled together utilizing a local area network, said method comprising the steps of:
  in response to an error in operation of said client caused by a malfunctioning part included within said client, said client identifying said malfunctioning part by identifying a serial number of said malfunctioning part;
  said client automatically transmitting a notification of said error and said identification of said part to said server without requiring a user's presence at said client; and
  said server generating a detailed repair request including said identification of said part, wherein said repair request is generated remotely from said client without requiring a user's presence at said client.

18. A method in a data processing system for permitting a server computer system to generate a detailed repair request utilized to repair a remote client computer system, said server and said client coupled together utilizing a local area network, said method comprising the steps of:
  in response to an error in operation of said client caused by a malfunctioning part included within said client, said client identifying said malfunctioning part by identifying a part number of said malfunctioning part;
  said client automatically transmitting a notification of said error and said identification of said part to said server without requiring a user's presence at said client; and
  said server generating a detailed repair request including said identification of said part, wherein said repair request is generated remotely from said client without requiring a user's presence at said client.

19. The method according to claim 18, further comprising the step of establishing a plurality of storage locations within an erasable memory element included within said client for storing identification information for each of a plurality of parts included within said client.

20. The method according to claim 19, further comprising the step of establishing a plurality of storage locations within a constantly powered application specific integrated circuit included within said client for storing a duplicate copy of identification information stored in some of said plurality of storage locations within said erasable memory element.

21. The method according to claim 20, further comprising the steps of:
  determining if each of said plurality of parts requires failure detection utilizing hardware; and
  for each of said plurality of parts requiring failure detection utilizing hardware, copying identification information stored in one of said plurality of storage locations within said erasable memory element associated with each of said plurality of parts requiring failure detection utilizing hardware to one of said plurality of storage locations within said application specific integrated circuit.

22. The method according to claim 21, further comprising the steps of:
  in response to an identification of said malfunctioning part, determining if said part is one of said plurality of parts requiring failure detection utilizing hardware;
  if said part is one of said plurality of parts requiring failure detection utilizing hardware, said client identifying said part utilizing said plurality of storage locations within said application specific integrated circuit; and
  if said part is not one of said plurality of parts requiring failure detection utilizing hardware, said client identifying said part utilizing said plurality of storage locations within said erasable memory element.

23. A data processing system for permitting a server computer system to generate a detailed repair request utilized to repair a remote client computer system, said server and said client coupled together utilizing a local area network, comprising:
  means responsive to an error in operation of said client caused by a malfunctioning part included within said client, for said client identifying said malfunctioning part by identifying a serial number of said malfunctioning part;
  means for said client automatically transmitting a notification of said error and said identification of said part to said server without requiring a user's presence at said client; and
  means for said server generating a detailed repair request including said identification of said part, wherein said repair request is generated remotely from said client without requiring a user's presence at said client.

24. A data processing system for permitting a server computer system to generate a detailed repair request utilized to repair a remote client computer system, said server and said client coupled together utilizing a local area network, comprising:
  means responsive to an error in operation of said client caused by a malfunctioning part included within said client, for said client identifying said malfunctioning part by identifying a part number of said malfunctioning part;

means for said client automatically transmitting a notification of said error and said identification of said part to said server without requiring a user's presence at said client; and means for said server generating a detailed repair request including said identification of said part, wherein said repair request is generated remotely from said client without requiring a user's presence at said client.

25. The system according to claim 24, wherein said means for said client identifying said malfunctioning part further includes means for said client identifying a physical location of said client.

26. The system according to claim 25, further comprising means for establishing a plurality of storage locations within an erasable memory element included within said client for storing identification information for each of a plurality of parts included within said client.

27. The system to claim 26, further comprising means for establishing a plurality of storage locations within a constantly powered application specific integrated circuit included within said client for storing a duplicate copy of identification information stored in some of said plurality of storage locations within said erasable memory element.

28. The system to claim 27, further comprising:

means for determining if each of said plurality of parts requires failure detection utilizing hardware; and means for each of said plurality of parts requiring failure detection utilizing hardware, for copying identification information stored in one of said plurality of storage locations within said erasable memory element associated with each of said plurality of parts requiring failure detection utilizing hardware to one of said plurality of storage locations within said application specific integrated circuit.

29. The system according to claim 28, further comprising:

means responsive to an identification of said malfunctioning part, for determining if said part is one of said plurality of parts requiring failure detection utilizing hardware;

means for if said part is one of said plurality of parts requiring failure detection utilizing hardware, said client identifying said part utilizing said plurality of storage locations within said application specific integrated circuit; and means for if said part is not one of said plurality of parts requiring failure detection utilizing hardware, said client identifying said part utilizing said plurality of storage locations within said erasable memory element.

* * * * *